(12) United States Patent
Chiga et al.

(10) Patent No.: US 8,664,327 B2
(45) Date of Patent: Mar. 4, 2014

(54) COATING COMPOSITION AND METHOD FOR FORMING COATING FILM

(75) Inventors: Koki Chiga, Miyoshi (JP); Hironori Tonomura, Miyoshi (JP); Yasushi Nakao, Miyoshi (JP)

(73) Assignee: Kansai Paint Co., Ltd., Hyogo (JP)

( * ) Notice: Subject to any disclaimer, the term of this patent is extended or adjusted under 35 U.S.C. 154(b) by 165 days.

(21) Appl. No.: 12/868,024

(22) Filed: Aug. 25, 2010

(65) Prior Publication Data

US 2011/0052822 A1 Mar. 3, 2011

(30) Foreign Application Priority Data

Aug. 31, 2009 (JP) ................................ 2009-199517

(51) Int. Cl.
| | |
|---|---|
| C08K 5/00 | (2006.01) |
| C08L 33/10 | (2006.01) |
| C08L 33/08 | (2006.01) |
| C08L 31/04 | (2006.01) |
| C08L 45/00 | (2006.01) |
| C08L 55/00 | (2006.01) |

(52) U.S. Cl.
USPC ............ 524/523; 524/515; 524/518; 524/522

(58) Field of Classification Search
USPC .......... 524/457, 502, 515, 518, 522, 523, 528
See application file for complete search history.

(56) References Cited

U.S. PATENT DOCUMENTS

| | | | |
|---|---|---|---|
| 5,348,998 A | * | 9/1994 | Ito et al. ........................ 524/190 |
| 2002/0102425 A1 | * | 8/2002 | Delmotte et al. ............. 428/520 |
| 2006/0100351 A1 | | 5/2006 | Butera et al. |
| 2006/0188656 A1 | | 8/2006 | Katsuta et al. |

FOREIGN PATENT DOCUMENTS

| | | | | |
|---|---|---|---|---|
| EP | 1 211 267 | | 6/2002 | |
| GB | 2 322 863 | | 9/1998 | |
| JP | 6-220397 | | 8/1994 | |
| JP | 2000159820 A | * | 6/2000 | ................ C08F 2/08 |
| WO | 2009/086267 | | 7/2009 | |

OTHER PUBLICATIONS

Machine Translation of JP 2000-159820 A; Inukai et al; Jun. 2000.*
Combined Search and Examination Report issued Dec. 10, 2010 in corresponding UK Patent Application No. GB1013581.2.

* cited by examiner

*Primary Examiner* — Karuna P Reddy
(74) *Attorney, Agent, or Firm* — Wenderoth, Lind & Ponack, L.L.P.

(57) ABSTRACT

The present invention provides a coating composition that is excellent in application workability, and that can form a cured coating film excellent in coating film performances such as scratch resistance, acid resistance, stain resistance, finished appearance, sagging resistance, etc. Specifically, the present invention provides a coating composition comprising an acrylic resin (A), a polyisocyanate compound (B) and a specific non-aqueous dispersion-type acrylic resin (C), wherein: the acrylic resin (A) is obtainable by copolymerization of a specific secondary hydroxyl group-containing monomer (a-1), a secondary hydroxyl group-containing polyoxyalkylene mono(meth)acrylate monomer (a-2), an isobornyl (meth)acrylate monomer (a-3) and at least one other copolymerizable unsaturated monomer (a-4), the unsaturated monomer (a-1) being used in an amount (mass) greater than that of the monomer (a-2).

3 Claims, No Drawings

COATING COMPOSITION AND METHOD FOR FORMING COATING FILM

TECHNICAL FIELD

The present invention relates to a coating composition that is excellent in application workability, and that can form a coating film excellent in scratch resistance, acid resistance and stain resistance.

BACKGROUND ART

Coating compositions that are applied to automobile bodies or like coated objects are required to provide excellent coating film performance in terms of scratch resistance, acid resistance, stain resistance, finished appearance, etc.

Hitherto, melamine crosslinking coating compositions have been widely used as coating compositions for such objects to be coated, i.e. coated objects. A melamine crosslinking coating composition contains a hydroxyl group-containing resin and a melamine resin that acts as a crosslinking agent. Since the melamine crosslinking coating composition has a high crosslinking density during heat curing, the coating film formed therefrom has excellent coating film performance such as scratch resistance, finished appearance, etc. However, the melamine crosslinkage in this coating composition easily undergoes hydrolysis by acid rain; therefore, this coating composition provides unsatisfactory acid resistance.

Patent Literature 1 discloses a two-package type urethane crosslinking coating composition comprising a hydroxyl group-containing acrylic resin, a hydroxyl group-containing oligoester, and an isocyanate prepolymer. The urethane crosslinkage in this coating composition hardly undergoes hydrolysis; therefore, the coating film formed from this coating composition has excellent acid resistance. However, the scratch resistance of this coating film is not satisfactory.

CITATION LIST

Patent Literature

[PTL 1] Japanese Unexamined Patent Publication No. H6-220397

SUMMARY OF INVENTION

Technical Problem

An object of the present invention is to provide a coating composition that is excellent in application workability, and that can form a cured coating film excellent in coating film performances such as scratch resistance, acid resistance, stain resistance, finished appearance, sagging resistance, etc.

Solution to Problem

The present inventors conducted extensive research to achieve the above object, and found that a coating composition comprising an acrylic resin that contains specific monomers as constituent components, a polyisocyanate compound and a non-aqueous dispersion-type acrylic resin can achieve the above object; thereby, the present invention was accomplished.

Specifically, the present invention provides the items as summarized below:

Item 1. A coating composition comprising: an acrylic resin (A) obtainable by copolymerization of an unsaturated monomer (a-1) represented by the following general formula (1):

[Chem. 1]

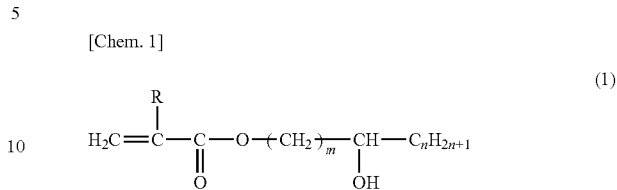

wherein R represents hydrogen or methyl, m represents an integer from 0 to 2, and n represents an integer from 1 to 3, with the proviso that the sum of m and n is from 1 to 3; a secondary hydroxyl group-containing polyoxyalkylene mono(meth)acrylate monomer (a-2); an isobornyl (meth)acrylate monomer (a-3); and at least one other copolymerizable unsaturated monomer (a-4), wherein the unsaturated monomer (a-1) is used in an amount (mass) greater than that of the monomer (a-2);
a polyisocyanate compound (B); and
a non-aqueous dispersion-type acrylic resin (C) obtainable by dispersion polymerization of at least one unsaturated monomer in the presence of a polymeric dispersion stabilizer and an organic solvent.

Item 2. The coating composition according to Item 1, which comprises an aliphatic diisocyanate or an aliphatic diisocyanate derivative as the polyisocyanate compound (B).

Item 3. The coating composition according to Item 1 or 2, which further comprises polymer fine particles (D) obtainable by emulsion polymerization of a monomer (d-1) containing at least two unsaturated groups per molecule, and at least one other unsaturated monomer (d-2), in the presence of an allyl group-containing reactive emulsifier.

Item 4. A method for forming a multilayer coating film, comprising sequentially forming on a coated object at least one layer of a colored base coating composition and at least one layer of a clear coating composition, wherein the method comprises the step of applying the coating composition of any one of Items 1 to 3 as the clear coating composition for forming the uppermost layer.

In the present invention, acrylate and methacrylate are collectively called (meth)acrylate.

Advantageous Effects of Invention

According to the coating composition of the present invention comprising an acrylic resin (A) containing specific monomers as constituent components, a polyisocyanate compound (B) and a non-aqueous dispersion-type acrylic resin (C), an optimum cure rate can be achieved in a curing process, enabling the formation of a coating film excellent in finished appearance such as surface smoothness etc. This is because the acrylic resin contains a secondary hydroxyl group, which has more moderate curability than a primary hydroxyl group, as a crosslinkable functional group supplied by an unsaturated monomer (a-1) represented by the above general formula (1) and a secondary hydroxyl group-containing polyoxyalkylene mono(meth)acrylate monomer (a-2).

Further, a combined use of the unsaturated monomer (a-1) and the monomer (a-2) enables the formation of a coating film that has an excellent balance of scratch resistance and stain resistance, and the additional use of a monomer (a-3) enables the formation of a coating film having excellent scratch resistance, in particular, excellent durability in scratch resistance.

Furthermore, the urethane crosslinkage formed by a reaction of the acrylic resin (A) and the polyisocyanate compound (B) can provide excellent resistance to acid hydrolysis, enabling the formation of a coating film excellent in acid resistance.

In addition, since the coating composition of the present invention comprises the non-aqueous dispersion-type acrylic resin (C) as a component of a rheology control agent, the coating composition provides excellent sagging resistance as well as excellent application workability.

As described above, the effects achieved by the present invention is that a coating composition that is excellent in application workability, and that can form a cured coating film excellent in finished appearance, scratch resistance, acid resistance and stain resistance, can be obtained.

DESCRIPTION OF EMBODIMENTS

A coating composition of the present invention (hereunder, sometimes referred to as the "present coating composition") and a method of the present invention for forming a multilayer coating film are described in detail below.

One of the features of the coating composition of the present invention is that it comprises an acrylic resin (A), a polyisocyanate compound (B), and a non-aqueous dispersion-type acrylic resin (C).

Acrylic Resin (A)

An acrylic resin (A) of the coating composition of the present invention is obtainable by copolymerization of an unsaturated monomer (a-1) represented by the above general formula (1); a secondary hydroxyl group-containing polyoxyalkylene mono(meth)acrylate monomer (a-2); an isobornyl (meth)acrylate monomer (a-3); and at least one other copolymerizable unsaturated monomer (a-4), wherein the unsaturated monomer (a-1) is used in an amount (mass) greater than that of the monomer (a-2).

Examples of the unsaturated monomers (a-1) include 2-hydroxypropyl (meth)acrylate, 2-hydroxybutyl (meth)acrylate, 3-hydroxybutyl (meth)acrylate, and the like. These monomers can be used singly, or in a combination of two or more. The alkyl group in the ester moiety of the unsaturated monomer (a-1) has 2 to 4 carbon atoms, and contains a secondary hydroxyl group. When the alkyl group has 5 or more carbon atoms, the obtained coating film may have a less satisfactory finished appearance; additionally, the pot life of the coating composition may be reduced. When the alkyl group contains a primary hydroxyl group, the obtained coating film tends to have less satisfactory finished appearance. This is presumably due to the difference in cure rates between primary hydroxyl groups and secondary hydroxyl groups. Specifically, it is presumably because the cure rate becomes faster when the unsaturated monomer (a-1) contains a primary hydroxyl group rather than a secondary hydroxyl group.

In the acrylic resin (A), it is important that the unsaturated monomer (a-1) be used in an amount, on a mass basis, greater than the amount of the secondary hydroxyl group-containing polyoxyalkylene mono(meth)acrylate monomer (a-2) (hereinafter also referred to as a "monomer (a-2)"). For example, the amount ratio of the unsaturated monomer (a-1) to the monomer (a-2) is preferably 10:1 to 1.8:1, on a mass basis.

This is because, although the monomer (a-2) provides the benefit of imparting scratch resistance to the obtained coating film, the monomer (a-2) has high hydrophilicity; therefore, when the monomer (a-2) is used in an amount greater than the unsaturated monomer (a-1), the obtained coating film will show insufficient stain resistance. When a large amount of the monomer (a-2) is used, the molecular weight between crosslinks in the obtained coating film becomes greater. This may cause a reduction in the hardness, weather resistance, and scratch resistance of the obtained coating film.

The unsaturated monomer (a-1) is preferably used in a proportion of 10 to 50 mass %, and more preferably 10 to 35 mass %, based on the total amount of the monomers (a-1) to (a-4). It is preferable that the amount of the unsaturated monomer (a-1) used be adjusted within the above-mentioned range, because a coating composition that has excellent curability, and that can form a coating film excellent in hardness and scratch resistance, can thereby be obtained.

The amount of each of the monomers contained in the acrylic resin (A) can be quantified by NMR, gas chromatography, or the like.

Examples of the secondary hydroxyl group-containing polyoxyalkylene mono(meth)acrylate monomers (a-2) include reaction products of polyoxyalkylene glycol and (meth)acrylate. Specific examples thereof include compounds represented by the following general formula (2),

[Chem. 2]

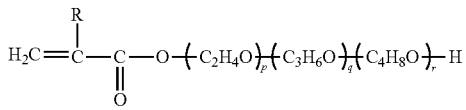

(2)

wherein R is a hydrogen atom or a methyl group, p, q and r are each independently 0 to 13, for example 0 to 10, and at least one of p, q and r represents 1 or more. The structure of polyoxyalkylene includes not only block copolymers, but also random copolymers.

The polyoxyalkylene mono(meth)acrylates represented by the above general formula (2) are compounds that have secondary hydroxyl groups.

Among the polyoxyalkylene mono(meth)acrylates represented by the general formula (2), those having a polyoxypropylene portion where q represents 1 or more are preferable. Specific examples thereof include "BLENMER" produced by Nippon Oil & Fats Co., Ltd. Examples of the BLENMER include the following (the expressions in the parentheses refer to the letters in the general formula (2)):

BLENMER PP-1000 (a compound in which R is a methyl group, p is 0, q is 4 to 6, and r is 0);
BLENMER PP-500 (a compound in which R is a methyl group, p is 0, q is 9, and r is 0);
BLENMER PP-800 (a compound in which R is a methyl group, p is 0, q is 13, and r is 0);
BLENMER AP-150 (a compound in which R is a hydrogen atom, p is 0, q is 3, and r is 0);
BLENMER AP-400 (a compound in which R is a hydrogen atom, p is 0, q is 6, and r is 0);
BLENMER AP-550 (a compound in which R is a hydrogen atom, p is 0, q is 9, and r is 0);
BLENMER 50PEP-300 (a compound in which R is a methyl group, p is 3.5, q is 2.5, and r is 0);
BLENMER 70PEP-350 (a compound in which R is a methyl group, p is 5, q is 2, and r is 0);
BLENMER 55PET-400 (a compound in which R is a methyl group, p is 5, q is 0, and r is 2);
BLENMER 30PET-800 (a compound in which R is a methyl group, p is 6, q is 0, and r is 10);
BLENMER 55PET-800 (a compound in which R is a methyl group, p is 10, q is 0, and r is 5);
BLENMER 30PPT-800 (a compound in which R is a methyl group, p is 0, q is 4, and r is 8);

BLENMER 50PPT-800 (a compound in which R is a methyl group, p is 0, q is 7, and r is 6);
BLENMER 70PPT-800 (a compound in which R is a methyl group, p is 0, q is 10, and r is 3);
BLENMER 10PPB-500B (a compound in which R is a methyl group, p is 0, q is 1, and r is 6); and
BLENMER 10APB-500B (a compound in which R is a hydrogen atom, p is 0, q is 1, and r is 6).

These can be used singly, or in a combination of two or more. In the present invention, it is important that the monomer (a-2) contains a secondary hydroxyl group to achieve excellent finished appearance of the obtained coating film by appropriately controlling the cure rate of the coating composition.

The monomer (a-2) is preferably used in a proportion of 5 to 35 mass %, and more preferably 5 to 25 mass %, based on the total amount of the monomers (a-1) to (a-4). It is preferable that the amount of the monomer (a-2) used be adjusted within the above-mentioned range, because a coating composition that has high curability, and that can form a coating film excellent in stain resistance and scratch resistance, can thereby be obtained.

With the further use of the isobornyl (meth)acrylate monomer (a-3) (hereinafter also referred to as a "monomer (a-3)") in the copolymerization to produce the acrylic resin (A), excellent initial scratch resistance of the obtained coating film can be achieved, and the deterioration of the scratch resistance, in particular, after a weather resistance test can be suppressed. The monomer (a-3) is preferably used in a proportion of 10 to 50 mass %, based on the total amount of the monomers (a-1) to (a-4). It is preferable that the amount of the monomer (a-3) used be adjusted within the above-mentioned range, because a coating composition that can form a coating film excellent in hardness and stain resistance can thereby be obtained.

Specific examples of the at least one other copolymerizable unsaturated monomer (a-4) include unsaturated monomers listed in (1) to (9) below.

(1) Primary hydroxyl group-containing (meth)acrylate: compounds having a primary hydroxyl group among monoester compounds of acrylic acid or methacrylic acid and dihydric alcohol. Examples thereof include 2-hydroxyethyl (meth)acrylate, 3-hydroxypropyl (meth)acrylate, 4-hydroxybutyl (meth)acrylate, and the like. These can be used singly, or in a combination of two or more.

When a primary hydroxyl group-containing (meth)acrylate is used, the primary hydroxyl group containing (meth) acrylate is preferably used in a proportion of less than 15 mass %, based on the total amount of the monomers (a-1) to (a-4), from the viewpoint of the finished appearance of the obtained coating film.

(2) Acid group-containing unsaturated monomer: compounds having, per molecule, one or more acid groups and one unsaturated bond. Examples thereof include carboxyl group-containing unsaturated monomers, such as (meth) acrylic acid, crotonic acid, itaconic acid, maleic acid, maleic anhydride, and the like; sulfonic acid group-containing unsaturated monomers, such as vinyl sulfonic acid, sulfoethyl (meth)acrylate, and the like; acid phosphate unsaturated monomers, such as 2-(meth)acryloyloxyethyl acid phosphate, 2-(meth)acryloyloxypropyl acid phosphate, 2-(meth) acryloyloxy-3-chloropropyl acid phosphate, 2-methacryloyloxyethylphenyl phosphoric acid, and the like. These can be used singly, or in a combination of two or more. The acid group-containing unsaturated monomer can also act as an internal catalyst in a crosslinking reaction of components (A) and (B). The acid group-containing unsaturated monomer is preferably used in a proportion ranging from 0 to 5 mass %, and particularly preferably 0.1 to 3 mass %, based on the total amount of the monomers (a-1) to (a-4).

(3) Esterified product of acrylic or methacrylic acid and a monohydric alcohol having 1 to 20 carbon atoms: for example, methyl (meth)acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, isooctyl (meth)acrylate, (iso)myristyl (meth)acrylate, isostearyl acrylate (tradename, produced by Osaka Organic Chemical Industry, Ltd.), cyclohexyl (meth)acrylate, lauryl (meth)acrylate, tricyclodecanyl (meth)acrylate, adamantyl (meth)acrylate, 3,5-dimethyladamantyl (meth)acrylate, 3-tetracyclododecyl methacrylate, tridecyl (meth)acrylate, stearyl (meth)acrylate, 4-methylcyclohexylmethyl (meth) acrylate, 4-ethylcyclohexylmethyl (meth)acrylate, 4-methoxycyclohexylmethyl (meth)acrylate, tert-butylcyclohexyl (meth)acrylate, cyclooctyl (meth)acrylate, cyclododecyl (meth)acrylate, tetrahydrofurfuryl (meth)acrylate, and the like.

Of these, unsaturated monomers (a-4-3-1) that have a branched chain hydrocarbon group with 8 or more carbon atoms may preferably be used to improve the scratch resistance of the coating film. When the unsaturated monomer (a-4-3-1) is included in the constituent component, the Tg and the polarity of the obtained acrylic resin (A) are lowered; thereby, a coating film with excellent scratch resistance achieved by the flexibility application, and excellent finished appearance achieved by the surface smoothness can be obtained. It is advantageous to use the above monomers having a branched chain structure as the constituent component, compared to an unsaturated monomer having a straight-chain hydrocarbon group with 8 or more carbon atoms, because the monomers with a branched structure can control the reduction of the Tg of the coating film; thereby, acid resistance can be improved.

Of those mentioned above, specific examples of unsaturated monomers having a branched chain hydrocarbon group with 8 or more carbon atoms include 2-ethylhexyl acrylate, isooctyl (meth)acrylate, (iso)myristyl (meth)acrylate, and isostearyl acrylate (tradename, produced by Organic Chemical Industry, Ltd.).

When the unsaturated monomer (a-4-3-1) is used, the proportion of the monomer is preferably within a range of from 3 to 50 mass %, and particularly preferably from 10 to 40 mass %, based on the total amount of the monomers (a-1) to (a-4).

(4) Alkoxysilyl group-containing unsaturated monomer: for example, vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane, vinyltris (β-methoxyethoxy)silane, and the like. Of these, preferable examples of alkoxysilane group-containing unsaturated monomers include vinyltrimethoxysilane, γ-acryloxypropyltrimethoxysilane, γ-methacryloxypropyltrimethoxysilane, and the like.

When an alkoxysilyl group-containing unsaturated monomer is used as the constituent component, crosslinkages may be formed by a condensation reaction of alkoxysilyl groups and a reaction of alkoxysilyl groups and hydroxyl groups, in addition to the crosslinkages of hydroxyl groups and isocyanate groups. Thereby, the crosslinking density of the obtained coating film is raised, resulting in improved acid resistance and stain resistance effects.

When an alkoxysilyl group-containing unsaturated monomer is used, the proportion of the monomer is preferably within a range of from 3 to 50 mass %, and particularly preferably 5 to 35 mass %, based on the total amount of the monomers (a-1) to (a-4).

(5) Aromatic unsaturated monomer: for example, styrene, α-methylstyrene, vinyltoluene, and the like.

When an aromatic-based unsaturated monomer is used as the constituent component, the Tg of the produced resin is raised, and a hydrophobic coating film with a high refractive index can be obtained. This results in improved water resistance and acid resistance effects, and improved finished appearance achieved by the improvement in the gloss of the coating film.

When an aromatic unsaturated monomer is used, the proportion of the monomer is preferably within a range of from 3 to 50 mass %, and particularly preferably 5 to 40 mass %, based on the total amount of the monomers (a-1) to (a-4).

(6) Glycidyl group-containing unsaturated monomer: compounds having, per molecule, one glycidyl group and one unsaturated bond, such as glycidyl acrylate, glycidyl methacrylate, and the like.

(7) Nitrogen-containing unsaturated monomer: for example, acrylamide, methacrylamide, dimethylacrylamide, N,N-dimethylpropylacrylamide, N-butoxy methylacrylamide, N-methylolacrylamide, N-methylolmethacrylamide, diacetone acrylamide, N,N-dimethylaminoethyl(meth)acrylate, vinylpyridine, vinylimidazol, and the like.

(8) Other vinyl compounds: for example, vinyl acetate, vinyl propionate, vinyl chloride, vinyl versatates ("VEOVA 9" and "VEOVA 10"; produced by Japan Epoxy Resin Co., Ltd.), and the like.

(9) Unsaturated bond containing nitrile compound: for example, acrylonitrile, methacrylonitrile, and the like.

The unsaturated monomers listed above in (1) to (9) can be used singly, or in a combination of two or more.

The unsaturated monomer (a-4) is preferably used in a proportion of 5 to 50 mass %, based on the total amount of the monomers (a-1) to (a-4).

In the present invention, the acrylic resin (A) can be produced by copolymerizing the monomers (a-1) to (a-4) using a known polymerization method, such as a solution polymerization method, a bulk polymerization method, a suspension polymerization method, an emulsion polymerization method, or the like. When the acrylic resin (A) is produced by, for example, a solution polymerization method, the above monomers are copolymerized in the presence of an organic solvent and a polymerization initiator.

Examples of organic solvents include toluene, xylene, Swasol 1000 (tradename, produced by Cosmo Oil Co., Ltd., a oil-based high-boiling point solvent), and like aromatic-based solvents; ethyl acetate, 3-methoxybutyl acetate, ethylene glycol ethyl ether acetate, propylene glycol methyl ether acetate, and like ester-based solvents; methyl ethyl ketone, methyl isobutyl ketone, methyl amyl ketone, and like ketone-based solvents, propyl propionate, butyl propionate, ethoxyethyl propionate, and the like.

These organic solvents may be used singly, or in a combination of two or more. However, considering the solubility of the acrylic resin (A), high-boiling-point ester solvents or high-boiling-point ketone solvents are preferably used.

Examples of polymerization initiators include known radical polymerization initiators, such as 2,2'-azobisisobutyronitrile, benzoyl peroxide, di-t-butyl peroxide, di-t-amyl peroxide, t-butyl peroctoate, 2,2'-azobis (2-methylbutyronitrile), and the like.

Further, a chain transfer agent such as 2-mercaptoethanol, n-octyl mercaptan and the like may also be used, if necessary.

The acrylic resin (A) preferably has a hydroxyl value ranging from 100 to 200 mg KOH/g, and more preferably 120 to 180 mg KOH/g. It is preferable that the acrylic resin (A) having a hydroxyl value within the above-mentioned range is used, because a coating composition that can form a coating film excellent in hardness, scratch resistance, water resistance, and impact resistance can thereby be obtained.

The acrylic resin (A) preferably has an acid value ranging from 1 to 30 mg KOH/g, and more preferably 2 to 20 mg KOH/g. It is preferable that the acrylic resin (A) having an acid value within the above-mentioned range is used, because a coating composition that can form a coating film excellent in hardness, scratch resistance, and finished appearance can thereby be obtained.

The acrylic resin (A) preferably has a weight average molecular weight ranging from 2,000 to 40,000, and more preferably 4,000 to 20,000. It is preferable that the acrylic resin (A) having a weight average molecular weight within the above-mentioned range is used, because a coating composition that can form a coating film excellent in hardness, acid resistance, weather resistance, and finished appearance (smoothness) can thereby be obtained.

As used herein, the weight average molecular weight is a value calculated using a weight average molecular weight measured by a gel permeation chromatograph (produced by Tosoh Corporation, "HLC8120GPC"), based on the weight average molecular weight of polystyrene. The measurements were conducted using the four columns "TSKgel G-4000 HxL", "TSKgel G-3000 HxL", "TSKgel G-2500 HxL" and "TSKgel G-2000 HxL" (tradenames, all produced by Tosoh Corporation), under the following conditions: mobile phase: tetrahydrofuran; measurement temperature; 40° C.; flow rate: 1 cc/min; and detector: RI. The number average molecular weight is a value obtained by the measurement conducted under the same conditions as above.

The acrylic resin (A) preferably has a glass transition temperature ranging from −40° C. to +80° C., and more preferably −20° C. to +60° C. It is preferable that the acrylic resin (A) having a glass transition temperature within the above-mentioned range is used, because a coating composition that can form a coating film excellent in hardness and surface smoothness can thereby be obtained.

The acrylic resin (A) can be used singly, or in a combination of two or more.

Polyisocyanate Compound (B)

The polyisocyanate compound (B) contained in the coating composition of the present invention has at least two free isocyanate groups per molecule, and polyisocyanate compounds that have been generally employed in the production of polyurethane can be utilized. Examples of the polyisocyanate compounds (B) include aliphatic polyisocyanates, alicyclic polyisocyanates, aliphatic-aromatic polyisocyanates, aromatic polyisocyantates, derivatives of these polyisocyanates, and the like.

Examples of aliphatic polyisocyanates include trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethylcaproate and like aliphatic diisocyanates, for example, lysine ester triisocyanates, 1,4,8-triisocyanato octane, 1,6,11-triisocyanato undecane, 1,8-diisocyanato-4-isocyanato methyloctane, 1,3,6-triisocyanato hexane, 2,5,7-trimethyl-1,8-diisocyanate-5-isocyanato methyloctane and like aliphatic triisocyanates; etc.

Examples of alicyclic polyisocyanates include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexylisocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, norbornane diisocyanate and like alicyclic diisocyanates, for example, 1,3,5-triisocyanato cyclohexane, 1,3,5-trimethylisocyanato cyclohexane, 2-(3-isocyanatopropyl)-2,5-di(isocyanatomethyl)-bicyclo[2.2.1]heptane, 2-(3-isocyanatopropyl)-2,6-di(isocyanatomethyl)-bicyclo[2.2.1]heptane, 3-(3-isocyanatopropyl)-2,5-di(isocyanatomethyl)-bicyclo[2.2.1]heptane, 5-(2-isocyanatoethyl)-2-isocyantemethyl-3-(3-isocyanatopropyl)-bicyclo[2.2.1]heptane, 6-(2-isocyanatoethyl)-2-isocyanatomethyl-3-(3-isocyanatopropyl)-bicyclo[2.2.1]heptane, 5-(2-isocyanatoethyl)-2-isocyanatomethyl-2-(3-isocyanatopropyl)-bicyclo[2.2.1]heptane, 6-(2-isocyanatoethyl)-2-isocyanatomethyl-2-(3-isocyanatopropyl)-bicyclo[2.2.1]heptane and like alicyclic triisocyanates; etc.

Examples of aliphatic-aromatic polyisocyanates include 1,3- or 1,4-xylylene diisocyanate or a mixture thereof, ω,ω'-diisocyanato-1,4-diethylbenzene, 1,3- or 1,4-bis(1-isocyanato-1-methylethyl)benzene (common name: tetramethylxylylene diisocyanate) or a mixture thereof, and like aliphatic-aromatic diisocyanates; and 1,3,5-triisocyanate methylbenzene and like aliphatic-aromatic triisocyanates; and the like.

Examples of aromatic polyisocyanates include m-phenylene diisocyanate, p-phenylene diisocyanate, 4,4'-diphenyl diisocyanate, 1,5-naphthalene diisocyanate, 2,4'- or 4,4'-diphenylmethane diisocyanate, or a mixture thereof, 2,4- or 2,6-tolylene diisocyanate, or a mixture thereof, 4,4'-toluidine diisocyanate, 4,4'-diphenylether diisocyanate and like aromatic diisocyanates, for example, triphenylmethane-4,4',4"-triisocyanate, 1,3,5-triisocyanato benzene, 2,4,6-triisocyanato toluene and like aromatic triisocyanates, for example, 4,4'-diphenylmethane-2,2',5,5'-tetraisocyanate and like aromatic tetraisocyanates; etc.

Examples of polyisocyanate derivatives include dimers, trimers, biurets, allophanates, carbodiimides, urethodiones, urethoimines, isocyanurates, oxadiazine triones, polymethylene polyphenyl polyisocyanates (crude MDI, polymeric MDI), crude TDI, and the like, as described above.

Such polyisocyanate compounds can be used singly, or in a combination of two or more. Among these polyisocyanate compounds, aliphatic diisocyanates and derivatives thereof can suitably be used, from the viewpoint of scratch resistance, weather resistance etc.

Blocked polyisocyanate compounds obtained by blocking with a blocking agent the isocyanate groups of polyisocyanate compounds having at least two free isocyanate groups per molecule, may be used as the polyisocyanate compound.

A blocking agent blocks free isocyanate groups. When the blocked polyisocyanate compounds are heated at, for example, 100° C. or more, preferably 130° C. or more, the isocyanate groups are regenerated to easily react with hydroxyl groups. Examples of such blocking agents include phenol, cresol, xylenol, nitrophenol, ethylphenol, hydroxydiphenyl, butylphenol, isopropylphenol, nonylphenol, octylphenol, methyl hydroxybenzoate and like phenol compounds; ε-caprolactam, δ-valerolactam, γ-butyrolactam, β-propiolactam and like lactam compounds; methanol, ethanol, propyl alcohol, butyl alcohol, amyl alcohol, lauryl alcohol and like aliphatic alcohols; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and like ether compounds; benzyl alcohol; glycolic acid; methyl glycolate, ethyl glycolate, butyl glycolate and like glycolates; lactic acid, methyl lactate, ethyl lactate, butyl lactate and like lactates; methylol urea, methylol melamine, diacetone alcohol, 2-hydroxyethyl acrylate, 2-hydroxyethyl methacrylate and like alcohol-based compounds; formamide oxime, acetamide oxime, acetoxime, methyl ethyl ketoxime, diacetyl monoxime, benzophenone oxime, cyclohexane oxime and like oxime compounds; dimethyl malonate, diethyl malonate, ethyl acetoacetate, methyl acetoacetate, acetylacetone and like active methylene compounds; butyl mercaptan, t-butyl mercaptan, hexyl mercaptan, t-dodecyl mercaptan, 2-mercaptobenzothiazole, thiophenol, methylthiophenol, ethylthiophenol and like mercaptan compounds; acetanilide, acetanisidide, acetotoluide, acrylamide, methacrylamide, acetamide, stearamide, benzamide and like acid amide compounds; succinimide, phthalimide, maleimide and like imide compounds; diphenylamine, phenylnaphthylamine, xylidine, N-phenylxylidine, carbazole, aniline, naphthylamine, butylamine, dibutylamine, butylphenylamine and like amine compounds; imidazole, 2-ethylimidazole and like imidazole compounds; 3,5-dimethylpyrazole and like pyrazole compounds; urea, thiourea, ethylene urea, ethylenethiourea, diphenylurea and like urea-based compounds; phenyl N-phenylcarbamate and like carbamate ester compounds; ethyleneimine, propyleneimine and like imine compounds; sodium bisulfite, potassium bisulfite and like sulfites; etc.

A solvent may be added for blocking (reacting with a blocking agent), if necessary. The solvents usable for the blocking reaction are preferably those that do not undergo reaction with isocyanate groups. Examples of such solvents include ketone-based solvents such as acetone and methyl ethyl ketone, ester-based solvents such as ethyl acetate, and other solvents such as N-methylpyrrolidone (NMP), and the like.

The polyisocyanate compound (B) may be used singly, or in a combination of two or more.

From the viewpoint of curability and scratch resistance of the obtained coating film, the equivalent ratio (NCO/OH) of the hydroxyl groups in the acrylic resin (A) to the isocyanate groups in the polyisocyanate compound (B) in the coating composition of the present invention is preferably within a range of from 0.5 to 2.0, more preferably 0.8 to 1.5.

The proportions of the acrylic resin (A) and the polyisocyanate compound (B) in the coating composition of the present invention are appropriately determined such that, on a solids basis, the acrylic resin (A) is generally within a range of from 40 to 85 mass %, preferably from 45 to 80 mass %, and the polyisocyanate compound (B) is generally within a range of from 15 to 60 mass %, preferably from 20 to 55 mass %, relative to the total solids content of components (A) and (B).

Non-Aqueous Dispersion-Type Acrylic Resin (C)

The non-aqueous dispersion-type acrylic resin (C) contained in the coating composition of the present invention is obtained by dispersion polymerization of at least one unsaturated monomer in the presence of a polymeric dispersion stabilizer and an organic solvent.

The polymeric dispersion stabilizer used in the production of the component (C) is a polymer that is generally obtained by copolymerizing a long-chain unsaturated monomer with, as necessary, other unsaturated monomers.

The long-chain unsaturated monomers used to produce the above polymer, i.e., the polymeric dispersion stabilizer, can be suitably selected according to the desired coating film performances. However, from the viewpoint of the copolymerizability and the solubility to an organic solvent, preferable long-chain unsaturated monomers can be exemplified as n-butyl (meth)acrylate, isobutyl (meth)acrylate, t-butyl (meth)acrylate, 2-ethylhexyl (meth)acrylate, cyclohexyl (meth)acrylate, n-octyl (meth)acrylate, lauryl (meth)acrylate, tridecyl (meth)acrylate, stearyl (meth)acrylate, and like $C_{4-18}$ alkyl or cycloalkyl esters of (meth)acrylic acid; methoxybutyl (meth)acrylate, methoxyethyl (meth)acrylate, ethoxybutyl (meth)acrylate, and like alkoxy alkyl esters of (meth)acrylic acid; benzyl (meth)acrylate, and like esters of aromatic alcohol with (meth)acrylic acid; adducts of hydroxy alkyl ester of glycidyl (meth)acrylate or (meth)acrylic acid with a monocarboxylic acid compound such as capric acid, lauric acid, linoleic acid, oleic acid, and the like; adducts of (meth)acrylic acid with a monoepoxy compound such as "Cardula E10" and the like; styrene, α-methylstyrene, vinyltoluene, p-chlorostyrene, p-t-butyl styrene, and like vinyl aromatic compounds; mono- or di-ester compounds of α,β-unsaturated carboxylic acid other than (meth)acrylic acids, such as itaconic acid, itaconic acid anhydride, crotonic acid, maleic acid, maleic anhydride, fumaric acid, citraconic acid and the like, with $C_{4-18}$ monohydric alcohol such as butyl alcohol, pentyl alcohol, heptyl alcohol, octyl alcohol, stearyl alcohol or the like; "Viscoat 8F", "Viscoat 8FM", "Viscoat 3F", "Viscoat 3FM" (tradenames, all produced by Osaka Organic Chemical Industry Co., Ltd., (meth)acrylate compounds having a fluorine atom in the side chain), perfluorocyclohexyl (meth)acrylate, perfluorohexylethylene, and like fluorine atom-containing compounds.

The unsaturated monomers other than the long-chain unsaturated monomers, optionally utilized in the polymerization to produce a polymeric dispersion stabilizer, are not particularly limited as long as they are unsaturated monomers other than the long-chain unsaturated monomers exemplified above. Examples of such monomers include methyl (meth)acrylate, ethyl (meth)acrylate, propyl (meth)acrylate, and like $C_{1-3}$ alkyl esters of (meth)acrylic acid; adducts of glycidyl (meth)acrylate with $C_{2-3}$ monocarboxylic acid compounds such as acetic acid propionic acid and the like; mono- or di-ester compounds of α,β-unsaturated carboxylic acid other than (meth)acrylic acid, such as itaconic acid, itaconic acid anhydride, crotonic acid, maleic acid, maleic anhydride, fumaric acid, citraconic acid and the like, with $C_{1-3}$ monohydric alcohol such as methyl alcohol, propyl alcohol and the like; (meth)acrylonitrile, and like cyano group-containing unsaturated compounds; vinyl acetate, and like vinyl ester compounds; ethyl vinyl ether, methyl vinyl ether, and like vinyl ether compounds; ethylene, propylene, vinyl chloride, vinylidene chloride, and like α-olefin compounds, etc. Examples of the unsaturated monomers other than the long-chain unsaturated monomers also include those in which the above-exemplified unsaturated monomers are substituted with a hydroxyl group or the like, such as 2-hydroxyethyl (meth)acrylate, and the like.

The polymerization for producing the above polymeric dispersion stabilizer can usually be performed by using a radical polymerization initiator. Examples of such radical polymerization initiators include 2,2'-azobisisobutyronitrile, 2,2'-azobis(2,4-dimethylvaleronitrile), and like azo-based initiators; benzoyl peroxide, lauryl peroxide, t-butyl peroctoate, t-butyl peroxy-2-ethylhexanoate and like peroxide-based initiators; etc. These polymerization initiators can generally be used in a proportion ranging from about 0.2 to about 10 parts by mass, preferably about 0.5 to about 5 parts by mass, per 100 parts by mass of the monomers utilized in polymerization. The reaction temperature during the polymerization is generally about 60 to about 160° C., and the reaction time of the polymerization is usually about 1 to about 15 hours.

The copolymer utilized as the dispersion stabilizer generally has a molecular weight within a range of about 5,000 to about 100,000, and preferably about 5,000 to about 50,000, as a weight average molecular weight. It is preferable that the copolymer having a molecular weight within the above-mentioned range is used as the dispersion stabilizer, because the aggregation and precipitation are thereby suppressed due to the stabilization of the dispersed particles, and an easy-to-handle coating composition with a viscosity that is not overly high can be obtained.

These polymeric dispersion stabilizers may be used singly, or in a combination of two or more. Further, other dispersion stabilizers, such as butyl-etherified melamine-formaldehyde resin, alkyd resin, etc. may also be used, if necessary, in combination therewith.

In the production of component (C), at least one unsaturated monomer is polymerized in an organic solvent in the presence of the polymeric dispersion stabilizer described above; afterward, a non-aqueous dispersion of insoluble polymer particles is prepared in the organic solvent.

The organic solvent usable in the above polymerization may be those that do not substantially dissolve the polymer particles produced in the polymerization, but that can serve as a good solvent for the polymeric dispersion stabilizer and the unsaturated monomer. Specific examples of such organic solvents include aliphatic hydrocarbon-based solvents, such as hexane, heptane, octane, and the like; aromatic hydrocarbons, such as benzene, toluene, xylene, and the like; alcohol-based solvents, such as methyl alcohol, isopropyl alcohol, n-butyl alcohol, isobutyl alcohol, octyl alcohol, and the like; ether-based solvents, such as cellosolve, butyl cellosolve, diethylene-glycol monobutyl ether, and the like; ketone-based solvents, such as methyl isobutyl ketone, diisobutyl ketone, methyl ethyl ketone, methyl hexyl ketone, ethyl butyl ketone, and the like; and ester-based solvents, such as ethyl acetate, isobutyl acetate, amyl acetate, 2-ethylhexyl acetate, and the like. These organic solvents can be used singly, or in a combination of two or more.

Particularly preferable examples of the above organic solvents include those prepared by arbitrarily combining aliphatic hydrocarbons, which is used as a main component, with aromatic hydrocarbons, alcohol-based solvents, ether-based solvents, ketone-based solvents, ester-based solvents, or the like.

The unsaturated monomers usable in the above polymerization are preferably those that have high polymerizability and a carbon number smaller than that of the monomer used as the monomer component of the polymeric dispersion stabilizer, because such unsaturated monomers are easily formed into dispersion polymer particles.

Examples of such unsaturated monomers include methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, cyclohexyl (meth)acrylate, n-octyl (meth)acrylate, lauryl (meth)acrylate, tridecyl (meth)acrylate, stearyl (meth)acrylate, and like $C_{1-18}$ alkyl or cycloalkyl esters of (meth)acrylic acid; methoxybutyl (meth)acrylate, methoxyethyl (meth)acrylate, ethoxybutyl (meth)acrylate, and like alkoxy alkyl esters of (meth)acrylic acid; benzyl (meth)acrylate, and like esters of the (meth)acrylic acid of aromatic alcohol; adducts of glycidyl (meth)

acrylate with $C_{2-18}$ monocarboxylic acid compounds such as acetic acid, propionic acid, oleic acid, p-t-butyl benzoic acid and the like; adducts of (meth)acrylic acid with monoepoxy compounds such as "Cardula E10" and the like; styrene, α-methylstyrene, vinyltoluene, p-chlorostyrene, p-t-butyl styrene, and like vinyl aromatic compounds; mono- or di-ester compounds of α,β-unsaturated carboxylic acid other than (meth)acrylic acid, such as itaconic acid, itaconic acid anhydride, crotonic acid, maleic acid, maleic anhydride, fumaric acid, citraconic acid and the like, with $C_{1-18}$ monoalcohol such as methyl alcohol, butyl alcohol, hexyl alcohol, stearyl alcohol, and the like; "Viscoat 8F", "Viscoat 8FM", "Viscoat 3F", "Viscoat 3FM" (tradenames, all produced by Osaka Organic Chemical Industry Co., Ltd., (meth)acrylate compounds having a fluorine atom in the side chain), perfluorocyclohexyl (meth)acrylate, perfluorohexylethylene, and like fluorine atom-containing compounds; (meth)acrylonitrile, and like cyano group-containing unsaturated compounds; vinyl acetate, vinyl benzoate, "VEOVA" (produced by Shell Chemicals and like vinyl ester compounds; n-butyl vinyl ether, ethyl vinyl ether, methyl vinyl ether, and like vinyl ether compounds; di(meth)acrylate of 1,6-hexanediol, tri (meth)acrylate of trimethylolpropane, divinylbenzene, and like polyvinyl compounds; ethylene, propylene, vinyl chloride, vinylidene chloride, and like α-olefin compounds; etc.

As described above, the monomer component stably forms polymer particles when a monomer component with a carbon number smaller than that of the monomer component of the polymeric dispersion stabilizer is used. From this viewpoint, (meth)acrylic-acid ester compounds, vinyl aromatic compounds, (meth)acrylonitrile, etc. which have 8 or less carbon atoms, preferably 4 or less, may be suitably used. These unsaturated monomers may be used singly, or in a combination of two or more.

The polymerization of the above unsaturated monomer is usually performed using a radical polymerization initiator. Examples of usable radical polymerization initiators include 2,2'-azobisisobutyronitrile, 2,2'-azobis(2,4-dimethylvaleronitrile), and like azo-based initiators; benzoyl peroxide, lauryl peroxide, t-butyl peroctoate, t-butyl peroxy-2-ethylhexanoate and like peroxide-based initiators; etc. These polymerization initiators can generally be used in a proportion ranging from about 0.2 to about 10 parts by mass, preferably about 0.5 to about 5 parts by mass, per 100 parts by mass of the monomers utilized in polymerization.

The amount ratio of the polymeric dispersion stabilizer to the unsaturated monomer utilized in the above polymerization is generally such that the unsaturated monomer is used in a proportion of about 3 to about 240 parts by mass, preferably about 5 to about 82 parts by mass, per 100 parts by mass of a polymeric dispersion stabilizer. The sum of the polymeric dispersion stabilizer and unsaturated monomer concentrations in the organic solvent is generally about 30 to about 70 mass %, and preferably about 30 to about 60 mass %.

The polymerization can be performed by a known process. The reaction temperature during the polymerization is usually about 60 to about 160° C., and the reaction time of the polymerization is usually about 1 to 15 hours.

The polymerization reaction performed as above can produce a stable non-aqueous dispersion, i.e., a non-aqueous dispersion-type acrylic resin, whose liquid phase is an organic solvent dissolving a polymeric dispersion stabilizer, and whose solid phase comprises polymer particles obtained by polymerizing an unsaturated monomer. The polymer particles generally have an average particle diameter within a range of about 0.1 to about 1.0 μm. The average particle diameter of the polymer particles is preferably adjusted within the above-mentioned range, because the viscosity of the non-aqueous dispersion does not become overly high therewith, and the swelling or aggregation of the polymer particles during storage of the coating composition can be alleviated.

In the production of component (C), binding of the polymeric dispersion stabilizer and the polymer particles in the non-aqueous dispersion can improve the storage stability and the mechanical properties of the non-aqueous dispersion. Even when they are bonded, almost no change is found in either the appearance of the dispersion state, or in the average particle diameter of the polymer particles.

Binding of the polymeric dispersion stabilizer to the polymer particles can be conducted by, for example, preliminarily performing, in the production of the polymeric dispersion stabilizer, partial copolymerization of the monomer component having a functional group such as hydroxyl, acid, acid anhydride, epoxy, methylol, isocyanate, amide, amino, or other groups; and using, as the monomer component that forms the polymer particles, a monomer having a functional group, such as hydroxyl, acid, acid anhydride, epoxy, methylol, isocyanate, amide, amino, and other groups, which can react with the above functional groups of the monomer component of the polymeric dispersion stabilizer. Examples of such combinations include an isocyanate group with a hydroxyl group, an isocyanate group with a methylol group, an epoxy group with an acid (anhydrous) group, an epoxy group with an amino group, an isocyanate group and an amide group, an acid (anhydrous) group with a hydroxyl group, and other combinations.

Examples of such monomers having a functional group include (meth)acrylic acid, crotonic acid, maleic acid, maleic anhydride, itaconic acid, itaconic acid anhydride, fumaric acid, citraconic acid, and like α,β-ethylene unsaturated carboxylic acids; glycidyl (meth)acrylate, vinyl glycidyl ether, allyl glycidyl ether, and like glycidyl group-containing compounds; (meth) acrylamide, N,N-dimethyl (meth) acrylamide, N-alkoxymethyl (meth)acrylamide, diacetone acrylamide, N-methylol (meth)acrylamide, and like carboxylic acid amide compounds; p-styrenesulfonamide, N-methyl-p-styrene sulfonamide, N,N-dimethyl-p-styrene sulfonamide, and like sulfonic acid amide group-containing compounds; t-butylaminoethyl (meth)acrylate, and like amino group-containing compounds; condensation product of 2-hydroxyethyl (meth)acrylate and phosphoric acid or a phosphoric-ester compound, compounds in which phosphoric acid or a phosphoric-ester compound is added to a compound having a glycidyl group, such as glycidyl (meth)acrylate, and like phosphate group-containing compounds; 2-acrylamide-2-methyl-propanesulfonic acid, and like sulfonic acid group-containing compounds; equimolar adducts of m-isopropenyl-α,α-dimethylbenzyl isocyanate, isophorone diisocyanate or tolylene diisocyanate with hydroxy (meth)acrylate, isocyanoethyl methacrylate, and like isocyanate group-containing compounds, etc.

Another method for binding the polymeric dispersion stabilizer to the polymer particles may comprise polymerizing an unsaturated monomer in the presence of a polymeric dispersion stabilizer having a polymerizable double bond.

The introduction of the polymerizable double bond to a polymeric dispersion stabilizer can be performed by, for example, using an acid group-containing monomer, such as carboxylic acid, phosphoric acid, sulfonic acid, or the like, as a copolymerization component of the resin, and reacting the acid group with a glycidyl group-containing unsaturated monomer, such as glycidyl (meth)acrylate, allyl glycidyl ether, or the like. The polymeric dispersion stabilizer may alternatively contain a glycidyl group to undergo a reaction with an acid group-containing unsaturated monomer. These reactions can be performed under known conditions.

Still another method for binding the polymeric dispersion stabilizer to the polymer particles may comprise producing a non-aqueous dispersion to which functional groups that react neither with a polymeric dispersion stabilizer nor with polymer particles are introduced; and thereafter, subjecting the produced non-aqueous dispersion to a reaction with a binder that binds the polymeric dispersion stabilizer to the polymer particles.

Specifically, for example, a hydroxyl group-containing unsaturated monomer alone, or a mixture of a hydroxyl group-containing unsaturated monomer with other unsaturated monomer is polymerized in the presence of a hydroxyl group-containing polymeric dispersion stabilizer and an organic solvent to produce a non-aqueous dispersion in which both the polymeric dispersion stabilizer and the polymer particles have a hydroxyl group. Thereafter, a polyisocyanate compound and the like is added to the produced non-aqueous dispersion to allow a reaction to occur at an ordinary temperature for several hours to several days, and at about 60 to about 100° C. for about 1 to about 5 hours.

The usable polyisocyanate compounds are those having at least two isocyanate groups per molecule, and examples thereof include tolylene diisocyanate, xylylene diisocyanate, 4,4'-diphenylmethane diisocyanate, and like aromatic diisocyanates or hydrides thereof; hexamethylene diisocyanate, lysine diisocyanate, dimer acid (dimerization products of tall oil fatty acid) diisocyanate, and like aliphatic diisocyanates; isophorone diisocyanate, and like alicyclic diisocyanates; etc.

In addition to the above, a combination of an acid group-containing polymeric dispersion stabilizer, polymer particles and polyepoxide; a combination of an epoxy group-containing polymeric dispersion stabilizer, polymer particles and polycarboxylic acid; a combination of an epoxy group- or isocyanate group-containing polymeric dispersion stabilizer, polymer particles and a polysulfide compound; etc. may also be utilized.

Examples of polyepoxide include bisphenol A type epoxy resin, bisphenol F type epoxy resin, novolac-type epoxy resin, epoxy group-containing acrylic resin, and the like. Examples of polycarboxylic acid include adipic acid, sebacic acid, azelaic acid, isophthalic acid, and the like. Examples of polysulfide include pentamethylene disulfide, hexamethylene disulfide, poly (ethylene disulfide), and the like.

As described above, the polymeric dispersion stabilizer and the polymer particles can be chemically bonded. In this case, a sufficient amount of various functional groups and/or polymerizable double bonds introduced into the polymeric dispersion stabilizer and/or the polymerizable particles is such that the dispersion stabilizer and/or particles have, per molecule, at least 0.1 functional groups and/or polymerizable double bonds on average.

In the thus-obtained non-aqueous dispersion, the polymeric dispersion stabilizer is chemically bonded to the polymer particles; therefore, the storage stability thereof is excellent, and the obtained coating film can exert excellent chemical and mechanical properties.

In the coating composition of the present invention, the non-aqueous dispersion-type acrylic resin (C) is suitably used in a proportion ranging from 1 to 10 mass %, preferably 2 to 8 mass %, on a solids basis, based on the total solids content of the acrylic resin (A) and the polyisocyanate compound (B), from the viewpoint of application workability (sagging resistance) of the obtained coating composition; and the finished appearance, such as the surface smoothness etc., of the formed coating film.

Other Components

The present coating composition comprises, as essential components, an acrylic resin (A), a polyisocyanate compound (B), and a non-aqueous dispersion-type acrylic resin (C). The present coating composition also generally contains an organic solvent, and may further contain, as necessary, a resin other than the above acrylic resin (A), a component of rheology control agents other than the above non-aqueous dispersion-type acrylic resin (C), and an additive, such as curing catalysts, pigments, pigment dispersants, leveling agents, UV absorbers, light stabilizers, plasticizers, and the like, that is generally utilized in the fields of coating compositions.

Examples of usable resins other than the above acrylic resin (A) include polyester resins, polyether resins, polyurethane resins, etc. Preferable examples thereof include hydroxyl group-containing polyester resins and hydroxyl group-containing polyurethane resins.

Such hydroxyl group-containing polyester resins may be produced by a known method by, for example, an esterification reaction of a polybasic acid and polyhydric alcohol. The polybasic acid is a compound having at least two carboxyl groups per molecule, and examples thereof include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, and anhydrides thereof. The polyhydric alcohol is a compound having at least two hydroxyl groups per molecule, and examples thereof include diol compounds, such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethyl pentanediol, hydrogenation bisphenol A, and the like; trihydric or higher polyol components, such as trimethylolpropane, trimethylolethane, glycerin, pentaerythritol, and the like; and hydroxycarboxylic acids, such as 2,2-dimethylolpropionic acid, 2,2-dimethylolbutanoic acid, 2,2-dimethylolpentanoic acid, 2,2-dimethylolhexanoic acid, 2,2-dimethyloloctanoic acid, and the like.

Alternatively, a monoepoxy compound such as propylene oxide, butylene oxide or like α-olefin epoxide, "Cardura E10" (tradename; produced by Japan Epoxy Resin Co., Ltd.; a synthetic highly branched saturated fatty acid glycidyl ester) or the like may be reacted with an acid, and the resulting compound may be introduced into the polyester resin.

The introduction of carboxyl groups into the polyester resin can be made by, for example, an addition of an acid anhydride to a hydroxyl group-containing polyester for half-esterification.

The hydroxyl group-containing polyester resin preferably has a hydroxyl value ranging from 100 to 200 mg KOH/g, and more preferably 120 to 180 mg KOH/g. It is preferable that the hydroxyl group-containing polyester resin having a hydroxyl value within the above-mentioned range is used, because a coating composition that can form a coating film excellent in scratch resistance and water resistance, can thereby be obtained.

The hydroxyl group-containing polyester resin preferably has a weight average molecular weight ranging from 2,000 to 40,000, more preferably 4,000 to 20,000. It is preferable that the hydroxyl group-containing polyester resin having the weight average molecular weight within the above-mentioned range is used, because a coating composition that can form a coating film exhibiting excellent film performance such as acid resistance etc., and having high surface smoothness can thereby be obtained.

Examples of the hydroxyl group-containing polyurethane resins include those obtained by reacting polyol with polyisocyanate.

Examples of polyols include low molecular weight polyols such as ethylene glycol, diethylene glycol, propylene glycol, butylene glycol, hexamethylene glycol and like dihydric alcohols; trimethylolpropane, glycerol, pentaerythritol, sorbitol and like trihydric of higher alcohols; and higher molecular weight polyols such as polyether polyols, polyester polyols, acrylic polyols, epoxy polyols and the like.

Examples of polyether polyols include polyethylene glycol, polypropylene glycol, polytetramethylene glycol and the like.

Examples of polyester polyols include polycondensates of the dihydric alcohols described above, dipropylene glycol, 1,4-butanediol, 1,6-hexanediol, neopentyl glycol or like alcohols with a dibasic acid such as adipic acid, azelaic acid, sebacic acid or the like; polyols obtained by ring-opening polymerization of a lactone such as polycaprolactone; polycarbonate diols; etc.

Further, for example, carboxyl group-containing polyols such as 2,2-dimethylolpropionic acid, 2,2-dimethlolbutanoic acid and the like may also be utilized.

Examples of polyisocyanates to be reacted with such polyols include aliphatic polyisocyanate compounds such as hexamethylene diisocyanate, trimethylhexamethylene diisocyanate, dimer acid diisocyanate, lysine diisocyanate and the like; biuret adducts and isocyanurate ring adducts of such polyisocyanates; alicyclic diisocyanate compounds such as isophorone diisocyanate, 4,4'-methylenebis(cyclohexylisocyanate), methylcyclohexane-2,4-(or -2,6-)diisocyanate, 1,3-(or 1,4-)di(isocyanatomethyl)cyclohexane, 1,4-cyclohexane diisocyanate, 1,3-cyclopentane diisocyanate, 1,2-cyclohexane diisocyanate and the like; biuret adducts and isocyanurate ring adducts of such polyisocyanates; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, m-(or p-)phenylene diisocyanate, 4,4'-biphenylene diisocyanate, 3,3'-dimethyl-4,4'-biphenylene diisocyanate, bis(4-isocyanatophenyl)sulfone, isopropylidene bis(4-phenylisocyanate) and the like; biuret adducts and isocyanuric ring adducts of such polyisocyanates; polyisocyanate compounds having at least three isocyanate groups per molecule, such as triphenylmethane-4,4',4"-triisocyanate, 1,3,5-triisocyanatobenzene, 2,4,6-triisocyanatotoluene, 4,4'-dimethyldiphenylmethane-2,2',5,5'-tetraisocyanate and the like; biuret adducts and isocyanurate ring adducts of such polyisocyanates; etc.

The hydroxyl group-containing polyurethane resin has a hydroxyl value ranging from 100 to 200 mg KOH/g, and preferably from 120 to 180 mg KOH/g. It is preferable that the hydroxyl group-containing polyurethane resin having a hydroxyl value within the above-mentioned range is used, because a coating composition that can form a coating film excellent in scratch resistance and water resistance can thereby be obtained.

The hydroxyl group-containing polyurethane resin preferably has a weight average molecular weight ranging from 2,000 to 40,000, and more preferably about 4,000 to about 20,000. It is preferable that the hydroxyl group-containing polyurethane resin having a weight average molecular weight within the above-mentioned range is used, because a coating composition that can form a coating film showing high film performance such as acid resistance, and having high surface smoothness, can thereby be obtained.

The resins other than the above-mentioned acrylic resin (A), such as polyester resin and polyurethane resin, may be used singly, or in a combination of two or more.

Examples of usable components of rheology control agents other than the above non-aqueous dispersion-type acrylic resin (C) include polymer fine particles (D) mentioned below; ultrafine barium sulphate; silica powder; bentonite-based flow control agent; polyamide-based flow control agent; polyurea-based flow control agents such as reaction products of mono primary amine and diisocyanate; etc.

Of these, polymer fine particles (D), polyurea-based flow control agents, bentonite-based flow control agents and ultrafine barium sulphate are preferable, and polymer fine particles (D) and polyurea-based flow control agents are particularly preferable.

The polymer fine particles (D) are obtained by emulsion polymerization of a monomer (d-1) having at least two unsaturated groups per molecule, and at least one other unsaturated monomer (d-2) in the presence of an allyl group-containing reactive emulsifier. Such polymer fine particles are disclosed in, for example, Japanese Unexamined Patent Publication H3-66770.

Examples of monomers (d-1) having at least two unsaturated groups per molecule include unsaturated monocarboxylic acid esters of polyhydric alcohol, unsaturated alcohol esters of polybasic acid, aromatic compounds each substituted with at least two unsaturated groups, and the like.

Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetra methacrylate, glycerol dimethacrylate, glycerol diacrylate, glycerolaryloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate, divinylbenzene, and the like. These monomers can be used singly, or in a combination of two or more.

The other unsaturated monomers (d-2) are other constituent components of the polymer fine particles, and the monomers (a-1) to (a-4) exemplified for the acrylic resin (A) may be utilized therefor. In addition, diene compounds such as butadiene and isoprene may also be utilized. These monomers can be used singly, or in a combination of two or more.

The proportions of the monomers (d-1) and (d-2) utilized in the copolymerization are not strictly limited, and may be determined according to the desired properties of the polymer fine particles. Generally, the monomer (d-1) is used in a proportion ranging from 1 to 60 mass %, preferably 1 to 50 mass %, and more preferably 1 to 40 mass %, and the monomer (d-2) is used in a proportion ranging from 40 to 99 mass %, preferably 50 to 99 mass %, and more preferably 60 to 99 mass %, based on the total amount of the monomers (d-1) and (d-2).

The monomers (d-1) and (d-2) may be copolymerized by known emulsion polymerization using a polymerization initiator in the presence of an allyl group-containing reactive emulsifier.

The allyl group-containing reactive emulsifier may be any of anionic, cationic or nonionic reactive emulsifiers as long as the reactive emulsifier has an allyl group; in particular, however, anionic reactive emulsifiers having an allyl group are suitably used.

Examples of anionic reactive emulsifiers having allyl groups include ammonium salts of sulfonic acid compounds having allyl groups. Specific examples thereof include an anionic emulsifier that comprises, as its basic structure, polyoxyethylene alkyl ether sulfuric ester salt, wherein a radical polymerizable allyl group is introduced into the compound as a part of the hydrophobic group thereof.

Examples of commercially available products of the above emulsifiers include "Aqualon KH-10" (produced by Dai-Ichi Kogyo Seiyaku Co., Ltd.), "LATEMUL S-180A" (produced by Kao Corporation), "SR-1025" (produced by Asahi Denka Kogyo K.K.), and the like.

The reactive emulsifier is suitably used in a proportion ranging from 0.1 to 10 mass %, preferably 1 to 5 mass %, based on the total amount of the monomers (d-1) and (d-2).

In addition to the above-mentioned reactive emulsifiers, anionic, nonionic, or amphoteric surfactants, etc. may also be utilized together as an emulsifier, if necessary. Specific examples of anionic surfactants include fatty acid, alkyl sulfate ester salt, alkylbenzene sulfonate, alkyl phosphate, and the like. Examples of nonionic surfactants include polyoxyethylene alkyl ether, polyoxyethylene alkyl aryl ether, polyoxyethylene compounds, sorbitan fatty acid ester, polyoxyethylene sorbitan fatty acid ester, polyoxyethylene alkylamine, alkyl alkanolamide, and the like. Examples of amphoteric surfactants include alkyl betaines, and the like.

A suitable concentration of the above emulsifier arbitrarily utilized together is within a range of 0.1 to 10 wt %, and preferably 1 to 5 wt %, based on the total amount of the monomers (d-1) and (d-2).

Examples of polymerization initiators include peroxides represented by ammonium persulfate, potassium persulfate, ammonium peroxide and the like; so-called redox initiators comprising these peroxides in combination with reducing agents such as sodium hydrogen sulfite, sodium thiosulfate, Rongalite, ascorbic acid and the like; azo compounds, such as 4,4'-azobis (4-cyanobutanoic acid), and the like; etc. Of these, azo compounds, in particular, water-soluble azoamide compounds can be suitably used. Water-soluble azoamide compounds are known (see Japanese Unexamined Patent Publication No. S61-218618 and Japanese Unexamined Patent Publication No. S61-63643). Examples of commercially available products thereof include "VA series" (tradename, produced by Wako Pure Chemical Industries, Ltd.).

The polymerization initiator is generally used in a proportion of 0.01 to 10 mass %, preferably 0.1 to 5 mass %, based on the total amount of the monomers (d-1) and (d-2).

The concentration of all of the unsaturated monomers during the emulsion polymerization reaction is generally within a range of 0.1 to 50 mass %, preferably 0.5 to 30 mass %.

Although the reaction temperature and reaction time of the emulsion polymerization vary depending on the polymerization initiator to be used, the reaction temperature is generally 60 to 90° C., and the reaction time is generally 5 to 10 hours.

From the viewpoint of water resistance of the obtained coating film, the polymer fine particles (D) generally have a hydroxyl value ranging from 0 to 70 mg KOH/g, preferably 0 to 60 mg KOH/g, and more preferably 0 to 50 mg KOH/g. Further, from the viewpoint of water-dispersibility etc., the polymer fine particles (D) generally have an acid value ranging from 0 to 90 mg KOH/g, preferably 0 to 70 mg KOH/g, and more preferably 0 to 50 mg KOH/g. In addition, the polymer fine particles (D) generally have an average particle diameter of 10 to 500 nm, preferably 20 to 250 nm, and more preferably 30 to 150 nm. As used herein, the average particle diameter was measured using a COULTER N4 submicron particle analyzer (produced by Nikkaki Bios Co., Ltd.).

The polymer fine particles (D) may be neutralized with a basic compound, if necessary. Examples of basic compounds used for the neutralization include ammonia; ethylamine, propylamine, butylamine, benzylamine, monoethanolamine, neopentanolamine, 2-aminopropanol, 3-aminopropanol, and like primary monoamines; diethylamine, diethanolamine, di-n- or di-iso-propanolamine, N-methylethanolamine, N-ethylethanolamine, and like secondary monoamines; N,N-dimethylethanolamine, trimethylamine, triethylamine, triisopropyl amine, methyldiethanolamine, and like tertiary monoamines; diethylenetriamine, hydroxyethylaminoethylamine, ethylaminoethylamine, methylaminopropylamine, and like polyamines; etc. These can be used singly, or in a combination of two or more.

The basic compound used for the neutralization is suitably used in an amount of 0.1 to 1.0 equivalents, particularly preferably 0.2 to 0.8 equivalents, per equivalent of the acid group in the polymer fine particles (D).

The polymer fine particles (D) are obtained in the state of an emulsion where the particles are dispersed in water. Therefore, when the polymer fine particles (D) are used to produce a solvent-based coating composition, the water, i.e., the dispersion medium, may be replaced with an organic solvent; thereby, the polymer fine particles can be used in the production of a solvent-based coating composition.

When the polymer fine particles (D) are used, from the viewpoint of application workability (sagging resistance) of the obtained coating composition and finished appearance such as surface smoothness etc. of the formed coating film, the polymer fine particles (D) are suitably used in a proportion ranging from 0.1 to 5 mass %, preferably 0.2 to 3 mass %, on a solids basis, based on the total solids content of the acrylic resin (A) and the polyisocyanate compound (B).

Examples of curing catalysts include tin octylate, dibutyltin di(2-ethylhexanoate), dioctyltin di(2-ethylhexanoate), dioctyltin diacetate, dibutyltin dilaurate, dibutyltin oxide, dioctyltin oxide, 2-ethylhexanoic acid lead, and like organic metal catalysts, tertiary amines, and the like.

These compounds described above as a curing catalyst can be used singly, or in a combination of two or more. The amount of curing catalyst used varies depending on the type, but the curing catalyst is preferably used in a proportion ranging from 0 to 5 mass %, more preferably 0.1 to 4 mass %, based on the total solids content of components (A) and (B).

Examples of pigments include titanium oxide, zinc white, carbon black, cadmium red, molybdenum red, chrome yellow, chromium oxide, Prussian blue, cobalt blue, azo pigments, phthalocyanine pigments, quinacridone pigments, isoindoline pigments, threne pigments, perylene pigments, and like coloring pigments; talc, clay, kaolin, baryta, barium sulfate, barium carbonate, calcium carbonate, silica, alumina white, and like extender pigments; and aluminum powder, mica powder, titanium oxide-coated mica powder, and like metallic pigments.

These pigments can be used singly, or in a combination of two or more. The amount of pigment used varies depending on the type, but the pigment is preferably used in a proportion ranging from about 0 to about 200 mass %, and more preferably about 1 to about 100 mass %, based on the total solids content of components (A) and (B).

The amount of coloring pigment used varies depending on the type, but the coloring pigment is preferably used in a proportion ranging from about 0 to about 150 mass %, and more preferably about 1 to about 100 mass %, based on the total solids content of components (A) and (B).

Usable examples of UV absorbers include known UV absorbers, such as benzotriazole UV absorbers, triazine UV absorbers, salicylic acid UV absorbers, benzophenone UV absorbers, and the like.

From the viewpoint of durability of scratch resistance, hydroxyl group-containing compounds are preferably used as a UV absorber.

From the viewpoint of weather resistance and yellowing resistance, the proportion of UV absorber in the coating composition is preferably within a range of from 0 to 10 mass %, more preferably 0.2 to 7 mass %, and still more preferably 0.5 to 5 mass %, based on the total solids content of components (A) and (B).

Examples of usable light stabilizers include known light stabilizers such as hindered amine light stabilizers.

From the viewpoint of weather resistance and yellowing resistance, the proportion of light stabilizer in the coating composition is preferably within a range of from 0 to 10 mass %, more preferably 0.2 to 7 mass %, and still more preferably 0.5 to 5 mass %, based on the total solids content of components (A) and (B).

When the coating composition of the present invention contains a polyisocyanate compound (component (B)) with unblocked isocyanate groups, it is preferable, from the viewpoint of storage stability, that the coating composition is a two-package-type coating composition comprising a package of the acrylic resin (A) and non-aqueous dispersion-type acrylic resin (C), and a package of the polyisocyanate compound (B); these packages are packed separately, and are mixed immediately before use.

Application Method of Coating Composition

Preferable examples of the coated objects onto which the present coating composition is applied include, but are not particularly limited to, the bodies of various vehicles, such as automobiles, motorcycles, containers and the like. Examples of coated objects also include those that constitute such vehicle bodies, such as cold rolled steel sheets, galvanized steel sheets, zinc alloy-plated steel sheets, stainless steel sheets, tinned steel sheets, and like steel sheets, aluminum sheets, aluminum alloy sheets, and like metal substrates; plastic substrates; and the like.

Usable coated objects also include such vehicle bodies, metal substrates etc. whose metal surfaces have undergone a surface treatment such as phosphate treatment, chromate treatment, composite oxide treatment, or the like. Usable coated objects further include such vehicle bodies, metal substrates etc. onto which an undercoat, such as an electrodeposition undercoat, and/or an intermediate coat, has been formed.

The method of applying the present coating composition is not limited. For example, air spray coating, airless spray coating, rotary atomization coating, curtain coating, or other coating methods may be employed to form a wet coat. In these coating methods, an electrostatic charge may be applied, if necessary. Of the above, air spray coating is particularly preferable. It is usually preferable to apply the coating composition to a film thickness of about 10 to about 50 μm (when cured).

When carrying out air spray coating, airless spray coating or rotary atomization coating, it is preferable that the viscosity of the coating composition is suitably adjusted using a solvent such as an organic solvent or the like, to a viscosity range that is suitable for use in the coating method, the range of which is usually from about 15 to about 60 seconds at 20° C. (viscometer: Ford cup No. 4).

The wet coat, which is formed by applying the present coating composition to a coated object, is usually cured by heating. Heating can be performed by known heating means. For example, drying furnaces, such as hot air furnaces, electric furnaces, infrared induction heating furnaces, etc. can be used. The heating temperature is usually 60° C. to 180° C., and preferably 90° C. to 150° C. The heating time is not particularly limited, but is preferably about 15 to about 30 minutes.

The present coating composition can form a cured coating film excellent in scratch resistance, acid resistance, stain resistance and finished appearance; therefore, the present coating composition can be suitably used as a top coat clear coating composition, a top coat enamel coating, or the like. The present coating composition can be suitably used as a coating composition for, in particular, automobiles.

Method for Forming Multilayer Coating Film

The method for forming a multilayer coating film, in which the present coating composition is applied as a top coat clear coating composition, may comprise successively forming on a coated object at least one layer of a colored base coating composition and at least one layer of a clear coating composition, wherein the present coating composition is applied as the clear coating composition for forming the uppermost layer.

Specific examples of such a method include a method for forming a multilayer coating film by a 2-coat 1-bake method, in which a solvent- or aqueous-based base coating composition is applied on a coated object onto which an electrodeposition coating film and/or intermediate coating film has been applied, the resulting uncured coating film is, as necessary, preheated at, for example, 40 to 90° C. for 3 to 30 minutes to accelerate the vaporization of the solvent in the base coating composition, and the present coating composition is then applied as a clear coating composition on the uncured base coating film, followed by simultaneous curing of the base coating film and the clear coating film.

The present coating composition is also suitably used as a top coat clear coating composition for a top clear coating in a 3-coat 2 bake method or a 3-coat 1-bake method.

The base coating composition used in the above manner may be a usual known thermosetting base coating composition, and specific examples thereof include coating compositions obtained by combining a curing agent such as amino resins, polyisocyanate compounds, blocked polyisocyanate compounds, or the like with reactive functional groups of a base resin such as acrylic resin, polyester resin, alkyd resin, urethane resin, or the like.

From an environmental and resource-saving point of view, the base coating composition is preferably a high-solid type that uses a small amount of organic solvent; further, an aqueous coating composition or a powder coating composition may also be used.

In the method for forming a multilayer coating film, comprising forming two or more clear coating films, a usual known thermosetting clear coating composition may be used as the clear coating composition, in addition to the present coating composition.

EXAMPLES

Hereunder, the present invention is explained in more detail with reference to Examples and Comparative Examples. However, the present invention is not limited to the following Examples. In the following examples, parts and percentages are by mass, and the film thickness is the thickness of a cured coating film.

Production of Acrylic Resin (A)

Production Examples 1-9

31-part quantities of ethoxyethyl propionate were introduced into four-necked flasks, each equipped with a stirrer, a thermometer, a condenser tube, and a nitrogen gas inlet, and the resulting mixtures were heated to 155° C. under a nitrogen atmosphere. When the temperature reached 155° C., the supply of nitrogen gas was stopped, and each monomer mixture comprising a composition containing the monomers and the polymerization initiator shown in Table 1 below was added thereto dropwise over 4 hours. Subsequently, aging was performed for 2 hours under a nitrogen atmosphere at 155° C., and each of the resulting products was then cooled to 100° C., followed by dilution with 32.5 parts of butyl acetate. Thereby, acrylic resins (A-1) to (A-9), each having a solids content of 60%, were obtained. Table 1 below shows the solids mass concentration (%) and resin properties of the obtained acrylic resins (A).

In Table 1, the glass transition temperature (Tg (° C.)) was calculated using the following formulae.

$$1/Tg(K) = (W1/T1) + (W2/T2) + \ldots \quad Tg(° C.) = Tg(K) - 273$$

In each formula, W1, W2, ... represent the mass fractions of the monomers used for copolymerization, and T1, T2, ... represent the Tg (K) of homopolymers of each of the monomers. T1, T2, ... are the values disclosed in the Polymer Handbook (4th Edition, J. Brandup, E. H. Immergut ed.); if not disclosed in the Polymer Handbook, the values are found in the Journal of Applied Polymer Science. Applied Polymer Symposium, 45, 289-316 (1990).

The acrylic resins (A-6) to (A-9) were produced for Comparative Examples.

TABLE 1

|  |  |  |  | Production Example No. | | | | | | | | |
|---|---|---|---|---|---|---|---|---|---|---|---|---|
|  |  |  |  | 1 | 2 | 3 | 4 | 5 | 6 | 7 | 8 | 9 |
|  |  |  |  | | | | | Acrylic Resin (A) No. | | | | |
|  |  |  |  | A-1 | A-2 | A-3 | A-4 | A-5 | A-6 | A-7 | A-8 | A-9 |
| Monomer mixture added dropwise | Monomer component (part by mass) | (a-1) | 2-Hydroxypropyl acrylate | 30 |  | 40 | 30 | 27 |  | 20 | 30 | 20 |
|  |  |  | 2-Hydroxypropyl methacrylate |  |  |  |  |  |  |  |  | 15 |
|  |  |  | 3-Hydroxybutyl methacrylate |  |  |  | 45 |  |  |  |  |  |
|  |  | (a-2) | BLENMER-PP-1000 | 10 | 10 |  | 10 | 15 | 16 | 30 | 10 |  |
|  |  |  | BLENMER-70PPT-800 |  |  | 4 |  |  |  |  |  |  |
|  |  | (a-3) | Isobornyl acrylate |  |  | 15 |  | 38.7 | 36 |  |  |  |
|  |  |  | Isobornyl methacrylate | 20 |  | 44 |  |  |  | 20 | 10 | 35 |
|  |  | (a-4) | 2-Hydroxyethyl methacrylate |  |  |  |  |  | 25 |  |  |  |
|  |  |  | Styrene | 15 | 15 | 5 | 10 | 10 | 15 | 17 | 15 | 15 |
|  |  |  | Methyl methacrylate | 18 |  |  |  |  | 15 | 15 | 17 |  |
|  |  |  | n-Butyl methacrylate |  | 13 |  |  |  |  |  |  | 13 |
|  |  |  | Lauryl methacrylate | 5 |  | 5 |  |  | 6 | 5 | 5 |  |
|  |  |  | Cyclohexyl methacrylate |  |  |  |  |  |  |  | 20 |  |
|  |  |  | KBM-503 (Note) |  |  |  | 10 |  |  |  |  |  |
|  |  |  | 2-Ethylhexyl acrylate |  |  |  |  | 10 |  |  |  |  |
|  |  |  | Acrylic acid |  |  | 2 | 1.3 |  |  |  |  |  |
|  |  |  | Methacrylic acid | 2 | 2 |  |  | 2 | 3 | 3 | 3 | 2 |
|  | Polymerization initiator | | Di-t-amyl peroxide | 5 | 5 | 5 | 5 | 5 | 5 | 5 | 5 | 5 |
| Resin properties |  |  | Hydroxy value (mg KOH/g) | 144 | 175 | 175 | 144 | 132 | 132 | 131 | 144 | 144 |
|  |  |  | Acid value (mg KOH/g) | 13 | 13 | 16 | 10 | 13 | 20 | 20 | 20 | 13 |
|  |  |  | Weight average molecular weight | 10000 | 10000 | 10000 | 10000 | 10000 | 10000 | 10000 | 10000 | 10000 |
|  |  |  | Glass transition temperature (Tg (° C.)) | 30 | 20 | 30 | 6 | 6 | 55 | 13 | 20 | 25 |
| Mass solids concentration (%) |  |  |  | 60 | 60 | 60 | 60 | 60 | 60 | 60 | 60 | 60 |

(Note - KBM-503: γ-methacryloxypropyltrimethoxysilane)

Production of Non-Aqueous Dispersion-Type Acrylic Resin (C)

Production Example 10

A 93-part quantity of heptane and 98 parts of the 55% polymeric dispersion stabilizer solution (Note 1) below were introduced into a four-necked flask equipped with a stirrer, a thermometer, a condenser tube, and a nitrogen gas inlet, and the resulting product was heated under reflux. The mixture of the monomers and the polymerization initiator shown below was added thereto dropwise over 3 hours, and the resulting product was aged for another 2 hours. Thereby, a non-aqueous dispersion-type acrylic resin (C-1) was obtained.

A Mixture of Monomers and a Polymerization Initiator

A mixture containing 15 parts of styrene, 40 parts of methyl methacrylate, 30 parts of acrylonitrile, 15 parts of 2-hydroxyethyl methacrylate, and 1.5 parts of t-butylperoxy-2-ethylhexanoate.

The thus-obtained non-aqueous dispersion-type acrylic resin (C-1) was a stable, milk-white, low-viscosity polymer dispersion having a mass solids concentration of 53%, a Gardner viscosity of B, and an average particle diameter (measured by an electron microscope) of 0.2 to 0.3 µm. Even after being allowed to stand for three months at room temperature, precipitates or coarse particles were not observed in the non-aqueous dispersion-type acrylic resin.

Synthesis of Polymeric Dispersion Stabilizer Solution (Note 1)

A 40-part quantity of isobutyl acetate and 40 parts of toluene were introduced into a four-necked flask equipped with a stirrer, a thermometer, a condenser tube, and a nitrogen gas inlet, and the resulting product was heated under reflux. The mixture of monomers and a polymerization initiator shown below was added thereto dropwise over 3 hours, after which the resulting product was aged for 2 hours. Thereby, a polymeric dispersion stabilizer solution was obtained.

Mixture of Monomers and a Polymerization Initiator

A mixture containing 10 parts of styrene, 49 parts of isobutyl methacrylate, 30 parts of 2-ethylhexyl methacrylate, 11 parts of 2-hydroxyethyl methacrylate, and 2 parts of azobisisobutyronitrile.

The thus-obtained polymeric dispersion stabilizer solution had a mass solids concentration of 55%, a Gardner viscosity of G, and a weight average molecular weight of 16,000.

Production of Polymer Fine Particles (D)

Production Example 11

A 355-part quantity of deionized water and 4 parts of LATEMUL S-120A (a sulfosuccinic acid-based allyl group-containing anionic reactive emulsifier, produced by Kao Corporation; solids content: 50%) were introduced into a four-necked flask equipped with a stirrer, a thermometer, a condenser tube, and a mantle heater, and the resulting product was heated to 90° C. under stirring. To the resulting product was added 20% of an aqueous solution in which 1.25 parts of VA-086 (a water-soluble azoamide polymerization initiator, 2,2'-azobis[2-methyl-N-(2-hydroxyethyl)-propionamide], produced by Wako Pure Chemical Industries, Ltd.) was dissolved in 50 parts of deionized water. Fifteen minutes thereafter, 5% of a monomer mixture (a mixture of 48 parts of styrene, 22 parts of methyl methacrylate, 22 parts of n-butyl acrylate and 8 parts of 1,6-hexanediol diacrylate) was added thereto. Subsequently, the resulting product was stirred for 30 minutes, and the remaining monomer mixture and the remaining polymerization initiator aqueous solution were then added thereto dropwise. The time used for adding the monomer mixture was 3 hours, and the time for adding the polymerization initiator aqueous solution was 3.5 hours, during which time the polymerization temperature was maintained at 90° C. After completion of the dropwise addition of the polymerization initiator aqueous solution, aging was performed for 30 minutes at 90° C. Thereafter, the resulting product was cooled to room temperature, and filtered through a 200-mesh nylon cloth. Thereby, an aqueous dispersion of polymer fine particles (D-1) having a mass solids concentration of 20% was obtained.

The obtained aqueous dispersion was dried in a stainless steel vat in an electric hot air dryer at 60° C. to remove water and obtain a solid. The obtained solid was dispersed again in ethylene glycol monomethyl ether, which had been heated to 60° C. Thereby, a dispersion of the polymer fine particles (D-1) having a mass solids concentration of 20% was obtained.

Production of Coating Composition

Examples 1 to 8 and Comparative Examples 1 to 5

Each of the acrylic resins (A), the non-aqueous dispersion-type acrylic resin (C), the polymer particles (D) obtained above in the Production Examples, and the starting materials shown in Table 2 below were mixed in the proportions shown in Table 2, and each resulting mixture was stirred with a disper. Thereby, coating compositions No. 1 to 13 were obtained. The proportions of the coating compositions shown in Table 2 are based on the solids mass ratio of each component. (*1) to (*5) in Table 2 represent the following:
(*1) N3300: Sumidur N3300, isocyanurate of hexamethylene diisocyanate, produced by Sumika Bayer Urethane Co., Ltd.; solids content: 100%; NCO content: 21.8%
(*2) Polyurea-based flow control agent: a diurea compound, which is a reaction product of 2 mol of benzylamine and 1 mol of hexamethylene-diisocyanate
(*3) UV absorber: triazine UV absorber
(*4) Light stabilizer: hindered amine light stabilizer
(*5) Leveling agent: siloxane leveling agent Butyl acetate was added to each of the coating compositions No. 1 to 13 obtained in Examples 1 to 8 and Comparative Examples 1 to 5, to adjust the viscosity thereof to 25 seconds as measured at 20° C. with a Ford cup No. 4.

Preparation of Test Panel

Using the coating compositions No. 1 to 13 obtained in Examples 1 to 8 and Comparative Examples 1 to 5, with the viscosity adjusted, respective test panels were prepared as follows.

Preparation of Coated Object

ELECRON GT-10 (tradename, produced by Kansai Paint Co., Ltd., a thermosetting epoxy resin-based cationic electrodeposition coating composition) was applied onto 0.8-mm thickness dull steel plates, which had been treated with zinc phosphate, by electrodeposition coating to a film thickness of 20 µm, and the resulting films were cured by heating at 170° C. for 30 minutes. Subsequently, Amilac TP-67-P (tradename, produced by Kansai Paint Co., Ltd., a polyester/melamine resin intermediate coating composition for automobiles; coating color: dark grey) was applied onto the resulting cured coating films by air spraying to a film thickness of 35 µm, and the resulting films were cured by heating at 140° C. for 30 minutes. Thereby, coated objects were prepared.

Preparation of Test Plate

Aqueous Base Coating WBC713T#202 (produced by Kansai Paint Co., Ltd.; an acrylic/melamine resin base coating composition for automobile topcoats; coating color: black) was applied onto the intermediate coating film of each of the coated objects prepared above to a film thickness of 15 µm. After a 10-minute preheating at 80° C., each of the coating compositions obtained in the Examples and Comparative Examples, with the viscosity adjusted, was respectively applied onto the uncured coating films to a film thickness of 35 μm. Each of the coated products was allowed to stand at room temperature for 7 minutes, and then heated at 140° C. for 20 minutes to simultaneously cure both of the coated films. The thus-obtained test plates were allowed to stand for seven days at ordinary temperature, and then the coating film performance tests described below were conducted.

Performance Test

Scratch Resistance:

The test plates were attached to the roof of an automobile body using a water-resistant adhesive tape (produced by Nichiban Co., Ltd.), and the automobile body with the coated test plates was washed 15 times in a car washer at 20° C. The 20° specular reflection (20° gloss value) of each of the coated test plates was measured. The gloss retention (%) against the 20° gloss value before washing was calculated to evaluate the scratch resistance. The higher the gloss retention, the better the scratch resistance. The car washer used was a "PO20 FWRC" (produced by Yasui Sangyo K.K.).

Acid Resistance:

0.4 cc of 40% sulfuric acid was dropped onto the coating surface of each of the test plates. The resulting coated test plates were then heated for 15 minutes on a hot plate heated to 60° C., and washed with water. The etching depth (μm) of each of the portions at which the sulfuric acid had been dropped was measured using a surface roughness tester ("Surfcom 570A"; a surface roughness measuring device; produced by Tokyo Seimitsu Co., Ltd.), with a cutoff of 0.8 mm (scanning rate of 0.3 mm/sec, 5.000-fold magnification), to evaluate the acid resistance. The smaller the etching depth, the better the acid resistance.

Finished Appearance:

The finished appearances were evaluated using a Wave Scan (tradename), produced by BYK Gardner. The evaluation was performed using a Short Wave value (SW value) measured by the Wave Scan. The Short Wave value is an index of the amplitude of the surface roughness at a wavelength of about 0.3 to about 1.2 mm, which can evaluate the fine texture condition of the coated surface. The smaller the measured value, the better the finished appearance (surface smoothness). In general, SW values of 10 or less indicate excellent finished appearance.

Stain Resistance:

Each of the coated test plates was subjected to accelerated weathering in an accelerated weathering tester ("Sunshine Weather-O-Meter"; produced by Suga Test Instruments Co., Ltd.) for 600 hours. Thereafter, a staining material made of a mixture of mud, carbon black, mineral oil and clay was applied to a piece of flannel, and lightly rubbed onto the coating surface of each of the coated test plates.

The coated test plates were then allowed to stand in a constant temperature, constant humidity room at 20° C. with a relative humidity of 75% for 24 hours, after which the coating surfaces were washed with running water. The degree of staining of the coating films was evaluated according to the difference in lightness (ΔL), based on the following criteria. The smaller the ΔL value, the better the stain resistance. ΔL was calculated according to the following formula.

$$\Delta L = (\Delta L \text{ value before the stain resistance test}) - (\Delta L \text{ value after the stain resistance test})$$

The ΔL value was measured using a CR-200 (color difference meter by Minolta Camera Co., Ltd.).

A: ΔL<1
B: 1≤ΔL<2
C: 2≤ΔL

The coated objects used in evaluation of the stain resistance were those prepared in the same manner as described in the Preparation of Test Plate section above, except that Amilac TP-67-P with white color was used as the intermediate coating composition. Test plates used in this evaluation were prepared by applying each coating composition produced above in the Examples and Comparative Examples, with the viscosity adjusted, onto the intermediate coating film of each of the coated objects obtained above to a film thickness of 35 μm; and allowing each of the resulting coated objects to stand for 10 minutes at room temperature, followed by heating at 140° C. for 20 minutes to cure the resulting coated films; the thus-obtained test plates were allowed to stand for seven days at ordinary temperature, similarly to the above, to evaluate the stain resistance.

Sagging Limit Thickness:

Used in this evaluation were 11 cm×45 cm coated objects on which, at a distance 3 cm away from the edge of the longitudinal side of the coated objects, 21 punch holes having a diameter of 5 mm were placed in a row at 2 cm intervals. Aqueous Base Coating Composition WBC713T#202 was applied onto the intermediate coating film of each of the coated objects to a film thickness of 15 μm, and the coated products were preheated for 10 minutes at 80° C.

Subsequently, each of the coating compositions whose viscosity had been adjusted was respectively applied onto the uncured coating surfaces using a minibell rotary atomizing electrostatic coater at a discharge amount of 200 cc, a rotation number of 40,000 rpm, a shaping air pressure of 1 kg/cm$^2$, a gun distance of 30 cm, and a booth temperature/humidity of 25° C./75%, with a film thickness gradient of about 30 μm to about 60 μm in a longitudinal direction. The coated test plates were erected substantially vertically, and 7 minutes after the application of the coating composition, the test plates were heated at 140° C. for 30 minutes to simultaneously cure both of the coated films. Thereby, test plates were prepared.

The thus-obtained test plates were examined to determine the portions where 2 mm sagging of the coating composition was observed from the lower end of each of the punch holes. The sagging resistance was evaluated by measuring the film thickness (sagging limit thickness (μm)) at the above portions. The larger the sagging limit thickness, the better the sagging resistance. When the sagging limit thickness is 45 μm or more, the sagging resistance is excellent.

Overall Evaluation:

In the coating of automobile bodies etc., to which the present invention pertains, the coating films are required to have high scratch resistance, acid resistance, finished appearance, stain resistance, and sagging resistance. Therefore, the overall evaluation was conducted with respect to each of the produced coating compositions in accordance with the following criteria:

A: a coating film having a scratch resistance (gloss retention (%)) of 90(%) or more, acid resistance (etching depth) of 0.4 μm or less, finished appearance (SW value) of 10 or less, stain resistance of A, and a sagging limit thickness of 45 μm or more B: a coating film having a scratch resistance (gloss retention (%)) of 90(%) or more, acid resistance (etching depth) of 0.4 μm or less, finished appearance (SW value) of 10 or less, stain resistance of B, and a sagging limit thickness of 45 μm or more C: a coating film having a scratch resistance (gloss retention (%)) of less than 90(%), acid resistance (etching depth) of more than 0.4 μm, finished appearance (SW value) of more than 10, stain resistance of C, or a sagging limit thickness of less than 45 μm Table 2 also shows the performance test results.

TABLE 2

|  |  | Examples | | | | | | | | Comparative Examples | | | | |
|---|---|---|---|---|---|---|---|---|---|---|---|---|---|---|
|  |  | 1 | 2 | 3 | 4 | 5 | 6 | 7 | 8 | 1 | 2 | 3 | 4 | 5 |
|  |  | Coating Composition No. | | | | | | | | | | | | |
|  |  | 1 | 2 | 3 | 4 | 5 | 6 | 7 | 8 | 9 | 10 | 11 | 12 | 13 |
| A Acrylic resin | (A-1) | 67 | 67 | 67 | 67 |  |  |  |  | 67 |  |  |  |  |
|  | (A-2) |  |  |  |  | 63 |  |  |  |  |  |  |  |  |
|  | (A-3) |  |  |  |  |  | 63 |  |  |  |  |  |  |  |
|  | (A-4) |  |  |  |  |  |  | 67 |  |  |  |  |  |  |
|  | (A-5) |  |  |  |  |  |  |  | 69 |  |  |  |  |  |
|  | (A-6) |  |  |  |  |  |  |  |  |  | 69 |  |  |  |
|  | (A-7) |  |  |  |  |  |  |  |  |  |  | 69 |  |  |
|  | (A-8) |  |  |  |  |  |  |  |  |  |  |  | 67 |  |
|  | (A-9) |  |  |  |  |  |  |  |  |  |  |  |  | 67 |
| B Polyisocyanate compound | N3300 (*1) | 33 | 33 | 33 | 33 | 37 | 37 | 33 | 31 | 33 | 31 | 31 | 33 | 33 |
| C Non-aqueous dispersion-type acrylic resin | (C-1) | 4 | 8 | 4 | 4 | 4 | 4 | 4 | 4 |  | 4 | 4 | 4 | 4 |
| D Polymer fine particles | (D-1) |  |  | 1 | 1 |  |  |  |  |  |  |  |  |  |
| Polyurea-based flow control agent (*2) |  |  |  |  | 0.2 |  |  |  |  |  |  |  |  |  |
| UV absorber (*3) |  | 2 | 2 | 2 | 2 | 2 | 2 | 2 | 2 | 2 | 2 | 2 | 2 | 2 |
| Light stabilizer (*4) |  | 2 | 2 | 2 | 2 | 2 | 2 | 2 | 2 | 2 | 2 | 2 | 2 | 2 |
| Leveling agent (*5) |  | 0.2 | 0.2 | 0.2 | 0.2 | 0.2 | 0.2 | 0.2 | 0.2 | 0.2 | 0.2 | 0.2 | 0.2 | 0.2 |
| Scratch resistance (gloss retention (%)) |  | 90 | 90 | 91 | 90 | 92 | 90 | 94 | 92 | 90 | 87 | 89 | 82 | 75 |
| Acid resistance (μm) |  | 0.4 | 0.4 | 0.4 | 0.4 | 0.4 | 0.4 | 0.3 | 0.3 | 0.4 | 0.4 | 0.4 | 0.4 | 0.4 |
| Finished appearance |  | 8 | 9 | 8 | 9 | 9 | 9 | 10 | 8 | 9 | 15 | 9 | 10 | 8 |
| Stain resistance |  | A | A | A | A | A | A | A | A | A | A | B | A | A |
| Sagging limit thickness (μm) |  | 46 | 48 | 48 | 49 | 46 | 45 | 47 | 46 | 40 | 44 | 46 | 46 | 45 |
| Overall evaluation |  | A | A | A | A | A | A | A | A | C | C | C | C | C |

The invention claimed is:

1. A coating composition comprising:
an acrylic, resin (A) obtained by copolymerization of an unsaturated monomer (a-1) represented by the following formula (I):

[Chem. 1]

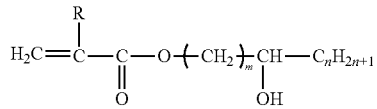

wherein R represents hydrogen or methyl, m represents an integer from 0 to 2, and n represents an integer from 1 to 3, with the proviso that the sum of m and n is from 1 to 3; a secondary hydroxyl group-containing polyoxyalkylene mono(meth)acrylate monomer (a-2): an isobornyl (meth) acrylate monomer (a-3); and at least one other copolymerizable unsaturated monomer (a-4), wherein the unsaturated monomer (a-1) is used in an amount (mass) greater than that of the monomer (a-2), the unsaturated monomer (a-1) is used in a proportion of 10 to 50 mass % based on a total amount of the monomers (a-1) to (a-4), the monomer (a-2) is used in a proportion of 4 to 35 mass % based on the total amount of the monomers (a-1) to (a-4), the monomer (a-3) is used in a proportion of 10 to 50 mass % based on the total amount of the monomers (a-1) to (a-4), and the unsaturated monomer (a-4) is used in a proportion of 5 to 50 mass based on the total amount of the monomers (a-1) to (a-4);

a polyisocyanate compound (B); and a non-aqueous dispersion-type acrylic resin (C) obtained by dispersion polymerization of at least one unsaturated monomer in the presence of a polymeric dispersion stabilizer and an organic solvent;

wherein the polyisocyanate compound (B) is an aliphatic diisocyanate or derivative thereof.

2. The coating composition according to claim 1, which further comprises polymer fine particles (D) obtained by emulsion polymerization of a monomer (d-1) containing at least two unsaturated groups per molecule, and at least one other unsaturated monomer (d-2), in the presence of an allyl group-containing reactive emulsifier.

3. A method for forming a multilayer coating film, comprising sequentially forming on a coated object at least one layer of a colored base coating composition and at least one layer of a clear coating composition, wherein the method comprises a step of applying the coating composition of claim 1 as the clear coating composition for forming an uppermost layer.

* * * * *